United States Patent [19]

Gautschi et al.

[11] Patent Number: 4,749,537

[45] Date of Patent: Jun. 7, 1988

[54] PROCESS FOR THE PRODUCTION OF FORMED MEMBERS FOR THE DISINFECTION OF WATER

[75] Inventors: Kurt Gautschi; Walter Sigrist, both of Zurich, Switzerland

[73] Assignee: Medichem Aktiengesellschaft, Triesen Furstentum, Liechtenstein

[21] Appl. No.: 843,789

[22] Filed: Mar. 25, 1986

Related U.S. Application Data

[63] Continuation-in-part of Ser. No. 448,860, Dec. 21, 1982, abandoned.

[30] Foreign Application Priority Data

Apr. 2, 1981 [CH] Switzerland ............... 2262/81

[51] Int. Cl.$^4$ .................. B29C 71/00; B29C 43/20; C02F 1/50; C02F 1/68
[52] U.S. Cl. ......................... 264/232; 264/82; 264/109; 264/234; 210/764
[58] Field of Search ............ 210/764, 501; 419/21, 419/10, 19, 22, 29, 35, 49, 64, 68; 264/109, 112, 82, 125, 232, 234; 424/131, 132; 23/308 R; 75/72, 81, 91, 118 R, 232; 106/1.13, 290; 148/186, 189, 6, 6.31, 13.2, 22, 24, 431; 428/668, 671, 672, 673, 674, 675; 164/46, 72, 75; 266/250, 251, 252; 420/501, 502, 557, 560; 423/23, 35, 44; 427/88, 435, 436

[56] References Cited

U.S. PATENT DOCUMENTS

| | | | |
|---|---|---|---|
| 2,396,515 | 3/1946 | Kreidl .................. | 167/14 |
| 2,593,298 | 1/1951 | Doty et al. ............ | 148/431 |
| 3,092,552 | 6/1963 | Romans ................. | 167/14 |
| 3,266,992 | 8/1966 | de Jong ................ | 167/82 |
| 3,268,444 | 8/1966 | Renn ................... | 210/501 |
| 3,933,961 | 1/1976 | Bums ................... | 420/501 |
| 3,936,364 | 2/1976 | Middle ................. | 426/66 |
| 3,956,444 | 5/1976 | Kibbel, Jr. ............ | 264/109 |
| 3,966,464 | 6/1976 | Davies ................. | 420/501 |
| 4,009,239 | 2/1977 | Bowen .................. | 264/112 |
| 4,024,257 | 5/1977 | Kibbel, Jr. ............ | 264/109 |
| 4,043,932 | 8/1977 | Fresenius .............. | 252/95 |
| 4,145,291 | 3/1979 | Console ................ | 210/232 |
| 4,394,336 | 7/1983 | Shimamura et al. ....... | 264/109 |
| 4,407,865 | 10/1983 | Nice ................... | 427/217 |
| 4,463,031 | 7/1984 | Someya ................. | 427/217 |
| 4,608,247 | 8/1986 | Heinig, Jr. ............ | 424/16 |

FOREIGN PATENT DOCUMENTS

| | | |
|---|---|---|
| 50-6718 | 1/1975 | Japan . |
| 1429318 | 2/1973 | United Kingdom . |
| 1404267 | 12/1973 | United Kingdom . |
| 1482930 | 4/1974 | United Kingdom . |

Primary Examiner—James Lowe
Assistant Examiner—J. Durkin
Attorney, Agent, or Firm—Scully, Scott, Murphy & Presser

[57] ABSTRACT

A process for the production of a prolonged release shaped product for the disinfection of water or aqueous solutions which comprises shaping, by deformation at a pressure of at least 8000 kg/cm$^2$, at least one difficulty soluble metal compound having microbicidal activity into shaped form, and treating the compound in a manner which produces an outer metal oxide layer on the surface of the shaped product which is readily soluble in water wherein the readily soluble metal oxide layer of the shaped product provides an initial source of microbicidal activity, and the difficulty soluble metal compound provides a prolonged release source of microbicidal activity.

7 Claims, 1 Drawing Sheet

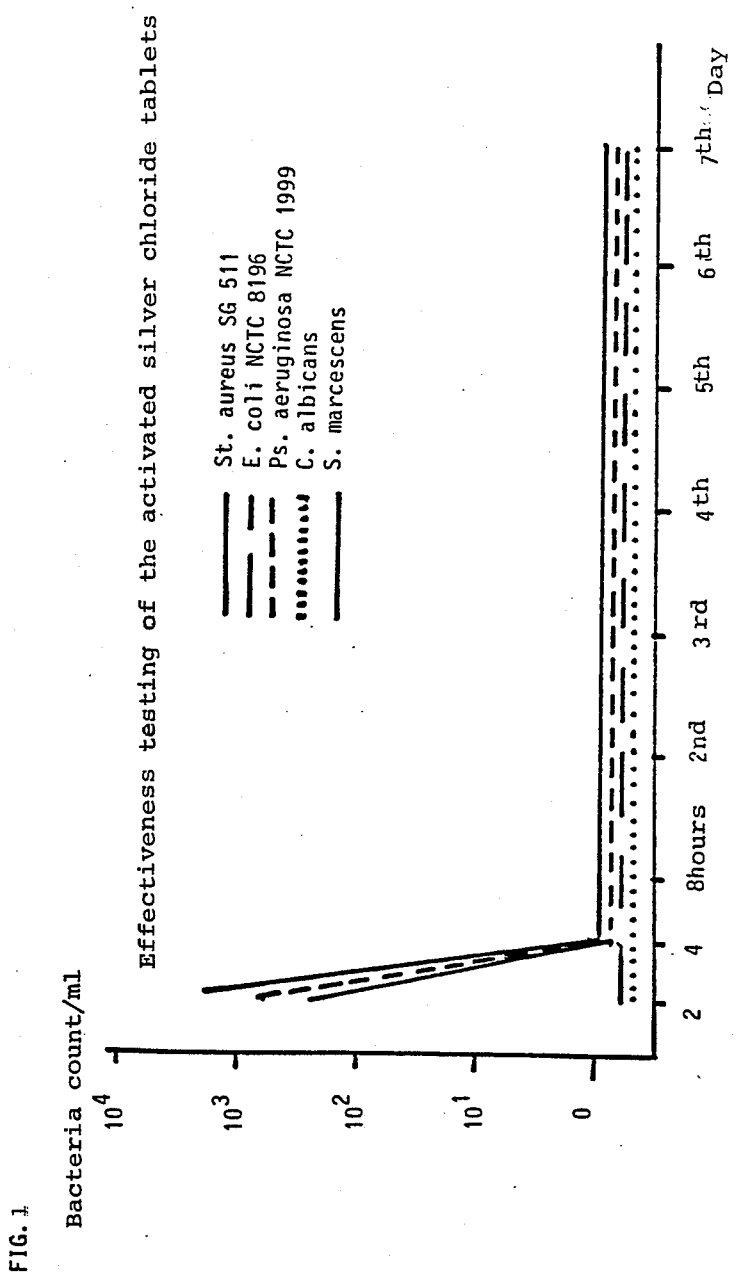

PROCESS FOR THE PRODUCTION OF FORMED MEMBERS FOR THE DISINFECTION OF WATER

RELATED APPLICATIONS

This application is a continuation-in-part of co-pending U.S. Ser. No. 448,860, filed Apr. 1, 1982 now abandoned.

BACKGROUND OF THE INVENTION

1. Field of the Invention

Numerous methods are presently known for the disinfecting of water and aqueous solutions, as well as for the production of potable water. The purely physical purification of water in clarifying installations, wherein the water is generally filtered through different sand layers and, eventually, is additionally treated with activated charcoal, is primarily adapted for a large scale water supply. However, water can also purified and disinfected through ultraviolet radiation, through ozonizing, through chlorination or in an oligo-dynamic manner to such an extent as to be, without hesitation, usable as potable water.

The oligo-dynamic principle is essentially predicated on the ability of the smallest quantities of suitable metals and metal salts to deaden or to inhibit the propagation of lower organisms in aqueous or gelatinuous milieus.

Based on this principle, different processes and means have been developed for the disinfection of water, which are widely employed, for example, for swimming pools, potable water supply in railroad cars, camping locations, ships, for traveling and the like.

All of these known methods facilitate the production of a satisfactory potable water and its storage over a limited period ranging between a few hours and a few weeks. The potable water canisters obtainable in one-liter plastic containers as an emergency drinking water supply from the water works of the City of Zurich, even guarantee a satisfactory condition of the contents for six months up to one year. In contrast therewith, a lengthier storage period for potable water is currently not known.

Accordingly, it is an object of the present invention to facilitate the storage of water and aqueous solutions; however, in particular, it is used to provide water which remains potable over a period of some years.

A number of disinfection systems which employ metals having microbicidal effects are currently known. For example, U.S. Pat. No. 4,043,932 teaches the use of a highly soluble silver salt, such as silver nitrate complexed with chlorine wherein the sterilizing effect is achieved by the combined action of the metal and chlorine atoms. The complex so formed is claimed to have both a long term and short term sterilizing effect. U.S. Pat. No. 4,145,291 describes an apparatus for disinfection of drinking water which is made of a porous ceramic material having metallic silver incorporated in it. British Pat. No. 1,429,318 describes a method for preparing a sterilizing product which comprises molding powdered silver chloride having an excess of chloride ion, heating to drive off any excess chlorine, and using the formed silver chloride plate to provide a constant, slow-release source of sterilization. However, none of the known methods have described a method by which a metal alone can be used to provide both an immediate source of disinfection, coupled with a prolonged-release source of disinfection, yielding an effective, but simple long-term method of water sterilization.

The foregoing and other objects are achieved by means of the novel formed members which achieve the disinfection with a difficultly soluble metal salt having a solubility of a maximum of 100 mg/liter, which is shaped into a form in which it will not deteriorate in the aqueous environment. In contrast with the known processes, by means of which there is achieved only a rapid disinfecting action, or which require more than one source of disinfection, the present invention provides both a short term and a long term action, by giving an initial burst of effective concentration of metal ions which is achieved quite rapidly in accordance with the solubility product of the salt, and thereafter remains constant up to the complete dissolution of the metal compound.

It is an object of the present invention to provide a process for the production of a shaped product for a protracted active-material release, wherein the members will not decompose in the aqueous environment, said process comprising shaping, by deformation at a pressure of at least 8000 kg/cm$^2$, at least one difficultly soluble metal compound having microbicidal activity into shaped form, and treating the compound in a manner which produces an outer metal oxide layer on the surface of the shaped product, said oxide layer being readily soluble in water, wherein the readily soluble metal layer of the shaped product provides an initial source of microbicidal activity, and the difficultly soluble metal compound provides a prolonged release source of microbicidal activity. The present invention also relates to the product so produced.

The following description primarily discusses the utilization of silver compounds. However, although such compounds are preferred for certain areas of application, other metal compounds which are difficult to dissolve, such as copper, tin or quicksilver compounds can also be utilized.

The utilization of a metal compound which is difficult to dissolve, for example, a difficultly soluble silver compound, such as silver chloride, AgCl, silver bromide AgBr, silver phosphate Ag$_3$PO$_4$, silver oxide/silver hydroxide, silver carbonate Ag$_2$CO$_3$, and so forth, allows a prolonged-release constant source of an active silver ion concentration which is necessary and sufficient for the disinfection of pure water or predetermined aqueous solutions. However, at the same time in order to initially rapidly and effectively kill all bacteria which are already present in the water or aqueous solutions, the difficultly soluble shaped metal product is also "activated" to render a portion of the shaped product readily soluble in water. Thus, the difficulty soluble metal is treated in such a way that a portion of the total product has a silver ion concentration which is higher by about a ten-potential in comparison with pure silver halogenide. In one embodiment, the "activation" can be carried out through the admixing of a more readily soluble silver salt, for example, silver phosphate, silver carbonate or silver hydroxide in an amend of about 1 to 10% relative to the silver chloride or bromide.

In a preferred embodiment, the activation is carried out through a thermal or chemical treatment, particularly in tablet form, for instance, through a short, and in general, a maximum 10 second long heating of the surface to high temperatures, preferably to about 1000° C., for example, with hot gases, through acid treatment, and so forth. Produced hereby on the surface of the formed member is, at least partially, a silver oxide/silver hydroxide layer, which evidences a higher solubility product than the difficultly soluble metal.

In the present description, silver hydroxide and silver oxide are to be considered as being identical, inasmuch as silver hydroxide, as is known, is subject to an aging process which, upon the separation of water, leads from hydroxide to oxide.

The "activation" thus provides the sufficiently high initial silver ion concentration which is necessary in order to effectively initially destroy any bacteria already present in the water to be treated, while the remaining, source of disinfection once the initial disinfection is accomplished.

In the following Table I there are compiled the solubility products and the silver content of an equilibrated aqueous solution in milligrams/liter for a few silver compounds which are difficult to dissolve:

TABLE I

| Compound | Formula | Solubility Product | Silver content of an equilibriated solution in mg/liter |
|---|---|---|---|
| (a) Silverchloride | AgCl | $1,7 \times 10^{-10}$ | 1,408 |
| (b) Silverbromide | AgBr | $3,3 \times 10^{-13}$ | $6,204 \times 10^{-2}$ |
| (c) Silvercarbonate | AgCO$_3$ | $8,2 \times 10^{-12}$ | 21,8 |
| (d) Silverhydroxide | AgOH | $2 \times 10^{-8}$ | 15,2 |
| (e) Silverphosphate | Ag$_3$PO$_4$ | $3,4 \times 10^{-14}$ | 46,4 |

While the compounds (a) and (b), and particularly the compound (a), due to their difficult solubilities, are best suited for the exceptionally long-term treatment of potable water, the compounds (c), (d) and (e) are excellent for spotting, in effect, for activation of (a) or (b). When used alone, however, (c), (d) and (e) are not quite safe for potable water due to their higher solubility, but are well suited for different other applications.

The silver compound or other suitable metal compounds which are difficult to dissolve, are in actual practice, most conveniently utilized in a form of an activated tablet or shaped product. The essence of such a tablet consists of in that metal ions in the same measure, as these would form a solid bond with microorganisms in an aqueous solution, will in accordance with the solubility product again go into solution from the tablet. This affords, at sealed conditions, a timewise practically unlimited retainability (in effect, the disinfection) of water or aqueous solutions even upon repeated recontamination.

That type of drinking or potable water, for example, which has been treated with silver chloride, on the basis of the silver ion concentration, is considered to be safe from a health standpoint. With respect to considerations of taste, it remains unchanged after a number of years. Furthermore, no discoloration of the water can be detected, and its bacteriological composition is satisfactory.

The shaped products, for example such as tablets, can be produced wherein the desired quantity of one or more silver compounds which are difficult to dissolve are pressed at a pressure of at least 8000 kg/cm$^2$ up to 15 tons/cm$^2$ into shapes of the desired form and size, for example into tablets, cubes, pearls, rods, and the like. Other useful shapes will be readily apparent to one skilled in the art. Generally, in the utilization of silver chloride or silver bromide, the above-mentioned "activation" is necessary to achieve the desired effect.

In the utilization of silver carbonate, silver oxide/silver hydroxide, silver phosphate in themselves, the tablets are advantageously brazed into an ion-permeable plastic material membrane, for example, Metricel VF-6" produced by the company Gelman, having a pore size of 0.45, since they can decompose under an intensive mechanical load (for example, ultrasound) or in the warmth in the water.

The inventive formed members are, above, all adapted to (1) preservation of potable water (civil defense, war supply, military, in tropical countries, nourishing of infants), (2) the disinfection of drinking water for domestic animals, (3) air conditioning installations for the disinfection of the supplied water, (4) in hospitals (breathing-air humidifiers and other medical apparatuses employing water, saline solutions, and others), and (5) Generally, wherein it is necessary to provide for the disinfection of water or of predetermined aqueous solutions.

It is recommended that water treated with the inventive formed members be stored in containers constituted of plastic material, ceramic glass or nobler metals such as silver, or in containers clad with such materials, in order to not disturb the oligo-dynamic action of the silver ions through a reaction with baser metals.

The minimum required concentration of silver ions in water, which is usually necessary and sufficient for the long-term disinfection thereof, consists of 0.1 to 1.0 mg/liter. Contrastingly, for the rapid and effective disinfection, in particular for an expected massive recontamination, there are, however, indicated initial silver ion concentrations of up to about 5 mg/liter. In general, the silver compounds are utilized in such a quantity that the active material concentration consists of at most 10 mg/liter.

Generally, the dosage consists of 200 mg of a difficultly soluble silver compound for 10 to 60 liters of water, regulated in accordance with the desired duration for maintaining the sterility.

The invention is now described in detail hereinbelow on the basis of the following examples and with reference to the accompanying drawing; in which:

FIG. 1 illustrates the effectiveness of an activated silver chloride tablet against different microorganisms in dependence upon time.

EXAMPLE 1

Commercial silver chloride is pressed at a pressure of 10,000 kg/cm$^2$ at room temperature into tablets each weighing 200 mg. After removal from the press, the tablets are individually drawn through a bunsen burner flame for activation, whereby the surface will slightly melt. The so obtained tablets are stored in a sealed container in the darkness. The tablets will darken under the effect of light without any manner causing any coloring of the water.

The thus obtained tablets are then tested as to their effectiveness in the following manner:

(A) Experimental Effectiveness Testing of the Silver Chloride Tablet

A tablet is added to 100 ml sterile Aqua dest. in a glass container with a screw closure cap.

Utilized as innoculum were presently 3 drops of a 48 hour boullion culture (Trypticase soy broth BBL) of the following reference origins or bacteria from a routine examining material:

| | |
|---|---|
| Staphylococcus aureus SG 511 | $7 \times 10^{11}$ bacteria/ml |
| E. coli NCTC 8196 | $1 \times 10^{13}$ bacteria/ml |
| Pseudomonas aeruginosa NCTC | $1 \times 10^{13}$ bacteria/ml |
| Serratia marcescens | $3 \times 10^{13}$ bacteria/ml |
| Candida albicans | $2 \times 10^{7}$ bacteria/ml |

After 2, 4 and 8 hours, the inoculated liquid quantity was thoroughly admixed through shaking and samples withdrawn by means of sterile pipettes.

The respective thinned out samples ($1 \times 10^{-1}$ to $1 \times 10^{-5}$) were filtered through a membrane (Gelman membrane filter Metricel GN 6 Metricel, at a filtering speed of 2 liters per minute). The sample withdrawals were carried out subsequently on daily basis after evaluating of the hourly values. The membrane filters were presently applied on a CLED plate (cysteine lactose electrolyte deficient Agar BBL) and incubated for 48 hours at 37° C. Inasmuch as, within the temperature range of 20° to 37° C., no significant distinctions could be ascertained with respect to the oligo-dynamic silver action, the further investigations were carried out at room temperature. The results are ascertainable from the enclosed drawing (FIG. 1).

B. Practical Attempts for the Disinfection of Water in Breathing-air Humidifiers Immediately after the humidifying system was replaced by a similar sterile one, by means of a sterile spray 10 ml of water was withdrawn from the water chamber for a bacteria count determination, and thereafter there was introduced the silver chloride tablet (first sample withdrawal). From the water chambers there were now withdrawn samples (10 ml) daily, and qualitative and quantitative bacteria determinations effected.

The duration of the examination was between 5 and 11 days. During this period neither the humidifying system nor the eventually present breathing hoses were replaced, both of which were heretofore changed daily; merely as the water loss in the water chamber was replaced in accordance with need with sterile Aqua dest.

The results of these investigations are compiled in Tables II through IV.

TABLE II

Moistening Tested Systems

31 de VBilbis
- 23 intubated or tracheotomated patients
  - 16 Patients Surgical Intensive Care Station
  - 7 Patients Medical Intensive Care Station
- 8 non-breathing assisted patients
  - 6 Patients Burn Care Station
  - 2 Patients ORL Intensive Care Station 23 Bennett/Cascade —— 23 tracheotomated or intubated patients
- 10 Patients Surgical Intensive Care Station
- 13 Patients Medical Intensive Care Station 8 Bird —— 8 tracheotomated or intubated patients Medical Intensive care Station Overall, during the investigative time period 457 samples were taken and evaluated through qualitative and quantitative bacteria determination. The results can be ascertained from the following Tables 2 and 3.

TABLE III

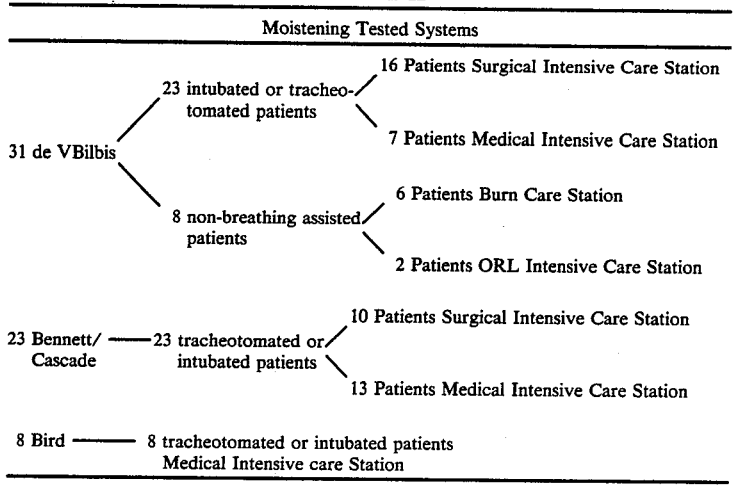

| Moistening System | Number of Patients | Clinic | Time sequence and Condition Days 1 2 3 4 5 6 7 8 9 10 11 |
|---|---|---|---|
| De Vilbis | 2 | ORL Intensive care station | • System since 12 hours in operation: $10^4$ Kol./ml Pseudomonas aeruginosa Addition of silver tablet starting on 2nd Day: no growth |
| Bennett/Cascade | 1 | Surgical Intensive care station | • System since 2 hours in operation: 60 Kol./ml Pseudomonas aeruginosa Addition of silver tablet starting on 2nd Day: no growth |

TABLE III-continued

| Moistening System | Number of Patients | Clinic | Time sequence and Condition Days 1 2 3 4 5 6 7 8 9 10 11 |
|---|---|---|---|
| De Vilbis | 1 | Surgical Intensive care station | • ↓ ▭ 1× • System since 8 hours in operation: 3 × 10³ Kol./ml Citrobacter Addition of silver tablet starting on 2nd Day: no growth |

TABLE IV

| Moistening System | Number of Patients | Clinic | Time duration (Days) 1 2 3 4 6 6 7 8 8 10 11 | Condition |
|---|---|---|---|---|
| De Vilbis | 15 | Surgical Intensive care Station | ▭ 1× ▭ 1× ▭ 1× ▭ 9× ▭ 1× ▭ 2× | No Growth |
| Bennett/Cascade | 9 | Surgical Intensive care Station | ▭ 1× ▭ 1× ▭ 1× ▭ 1× ▭ 3× | No Growth |
| De Vilbis | 7 | Medical Intensive care Station | ▭ 1× ▭ 5× | No Growth |
| Bennett/Cascade | 13 | Medical Intensive care Station | ▭ 1× ▭ 3× ▭ 8× | No Growth |
| Bird | 8 | Medical Intensive care Station | ▭ 2× ▭ 5× ▭ 2× | No Growth |
| De Vilbis | 6 | non breathing-assisted Burn care station | Patients ▭ 1× ▭ 2× ▭ 1× ▭ 3× | No Growth |

EXAMPLE 2

This example illustrates the superiority of the product produced by the present process when compared with commercially available silver tablets, as described in U.S. Pat. No. 4,043,932. In the following tests, "CERTISIL 100" is the product of Example 2 of the cited U.S. patent, while "CERTISIL COMBINA 10" additionally contains hypochlorite for the splitting off of chlorine, as described therein.

The product of the present invention is a 125 mg silver chloride tablet "activated" as described in Example 1.

The tests performed are a quantitative suspension test, and Use-dilution tests to determine the antimicrobial activity in accordance with the American Association of Official Analytical Chemists and the German Society for Hygiene and Microbiology.

Test strains used were as follows:

| Test-strains: | Staphlococcus aureus | ATCC 6538 |
|---|---|---|
| | Klebsiella aerogenes | ATCC 10031 |

-continued

| | |
|---|---|
| *Pseudomonas aeruginosa* | ATCC 15442 |
| *Candida albicans* | ATCC 10231 |

The present tablets are stable whereas the "CERTISIL" products are in solution.

Quantitative Suspension Test

For 100 ml of Aqua dest., one of the present tablets was used, while the CERTISIL products are used in their prescribed dilutions of 1 g/100 liter (CERTISIL 100), or 1 g/10 liter CERTISIL COMBINA 10).

The test strains were cultured for 24 hours, and 1 drop of each culture was added to separate water samples containing the products to be tested. The tests were conducted at room temperature. Subcultures were taken from each sample at 2, 4, 8, 24 and 144 hours. The following results were observed:

After 8 hours of exposure to the present tablets, none of the 4 test strains showed any growth.

With CERTISIL 100, growth of Staphyloccus and Candida only was prevented within 2 hours, but Klebsiella and Pseudomonas proliferated after an exposure time of 144 hours.

With CERTISIL COMBINA 10, growth of 3 strains was prevented after 8 hours, but Pseudomonas proliferated after an exposure of 144 hours.

USE-DILUTION TEST

The three products were again employed as described above, but the test strains were used as a mixture rather than individually.

On each of 5 consecutive days, the mixture was added (1 drop/100 ml) and subcultures were made each day after 24 hours exposure time. The following table shows the number of microorganisms present in each subsequent day.

| | Day | | | | |
|---|---|---|---|---|---|
| | 1 | 2 | 3 | 4 | 5 |
| Present tablet | 0 | 0 | 0 | $2.5 \times 10^3$ | $3.9 \times 10^3$ |
| Certisil 100 | 0 | $9 \times 10^1$ | $3.6 \times 10^2$ | $6.9 \times 10^2$ | $4.8 \times 10^3$ |
| Certisil comb. 10 | 0 | 0 | $1.8 \times 10^3$ | $2.7 \times 10^3$ | $4.5 \times 10^3$ |
| Control | $1 \times 10^6$ | $2.4 \times 10^6$ | $9 \times 10^6$ | $8.3 \times 10^6$ | $4.8 \times 10^6$ |

The foregoing tests were conducted by an independent laboratory, Hygiene Microbilogic Labor, Lucerine, Switzerland, and were deemed by the tester to satisfactorily demonstrate the superiority of the present tablets over the products of U.S. Pat. No. 4,043,932.

What is claimed is:

1. A process for the production of a prolonged release shaped product for the disinfection of water or aqueous solutions which comprises shapng, by deformation at a pressure of at least 8000 kg/cm², at least one difficulty soluble metal compound having microbicidal activity into shaped form, and treating the shaped compound in a manner which produces an outer metal oxide layer on the surface of the shaped product, said oxide layer being readily soluble in water, wherein the readily soluble metal oxide layer of the shaped product provides an initial source of microbicidal activity, and the difficulty soluble metal compound provides a prolonged release source of microbicidal activity.

2. The process of claim 1 wherein the metal compound is treated by heating to a temperature sufficient to convert a portion of the tablet to an oxide form of the metal compound.

3. The process of claim 1 wherein the metal compound is treated with acid.

4. The process of claim 1 wherein the metal is selected from the group consisting of silver, tin, copper and quicksilver.

5. The process of claim 4 wherein the metal is silver.

6. The process of claim 5 wherein the metal compound is silver bromide or silver chloride.

7. The process of claim 1 wherein the readily soluble metal oxide is present in an amount of about 1 to about 10% of the amount of difficulty soluble metal.

* * * * *